(12) United States Patent
Bellemo

(10) Patent No.: US 7,213,402 B2
(45) Date of Patent: May 8, 2007

(54) REFRIGERATION-BASED COMPRESSED-GAS DRYER

(75) Inventor: Luciano Bellemo, Chioggia (IT)

(73) Assignee: Domnick Hunter Hiross S.p.A., S. Angelo di Piove (PD) (IT)

( * ) Notice: Subject to any disclaimer, the term of this patent is extended or adjusted under 35 U.S.C. 154(b) by 271 days.

(21) Appl. No.: 11/094,081

(22) Filed: Mar. 31, 2005

(65) Prior Publication Data
US 2005/0247075 A1 Nov. 10, 2005

(30) Foreign Application Priority Data
May 7, 2004 (IT) .......................... MI2004A0926

(51) Int. Cl.
*F25D 17/06* (2006.01)
(52) U.S. Cl. ............................. 62/93; 62/271
(58) Field of Classification Search ............... 62/92, 62/93, 94, 95, 272, 285, 291, 228.1
See application file for complete search history.

(56) References Cited

U.S. PATENT DOCUMENTS

| | | | |
|---|---|---|---|
| 2,142,856 A * | 1/1939 | Lieb et al. ................... 62/59 |
| 5,715,696 A * | 2/1998 | Salvagno et al. ............. 62/272 |
| 6,202,424 B1 * | 3/2001 | Hattori et al. ................ 62/93 |
| 6,470,693 B1 * | 10/2002 | Dickey ........................... 62/90 |

* cited by examiner

Primary Examiner—Melvin Jones
(74) *Attorney, Agent, or Firm*—Wenderoth, Lind & Ponack, L.L.P.

(57) ABSTRACT

A refrigeration-based compressed-gas dryer comprises a group of heat exchangers (10), this group of heat-exchangers including a gas-to-gas heat exchanger (20), an evaporator (30), a condensate separator (50) and at least a refrigerating circuit (40), wherein in said gas-to-gas heat exchanger (20) there is provided a pre-cooling section (22), where heat is exchanged between a mixture of compressed gases to be dried entering said group of heat exchangers (10), and a heating section (24) for a mixture of dried gases exiting a condensate separator (50), wherein in said evaporator (30) there is provided a cooling section (32), where heat is exchanged between said mixture of compressed gases to be dried exiting the gas-to-gas heat exchanger (20), and an evaporating section (34) for a refrigerant medium, where said mixture of compressed gases is cooled down to a desired dew point. According to the present invention, said group of heat exchangers (10) comprises a set of finned or embossed plates (21, 31, 33), which are stacked and joined with each other so as to be adapted to create a number of passages for the counter-current flow and/or cross flow and/or mixed flow of said gases, wherein said group of heat exchangers is provided as a unitary piece.

20 Claims, 12 Drawing Sheets

PRIOR ART

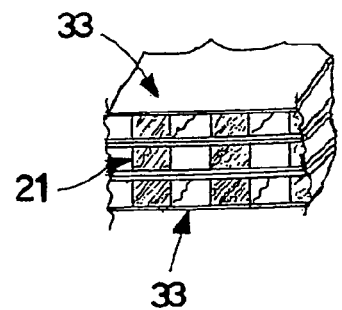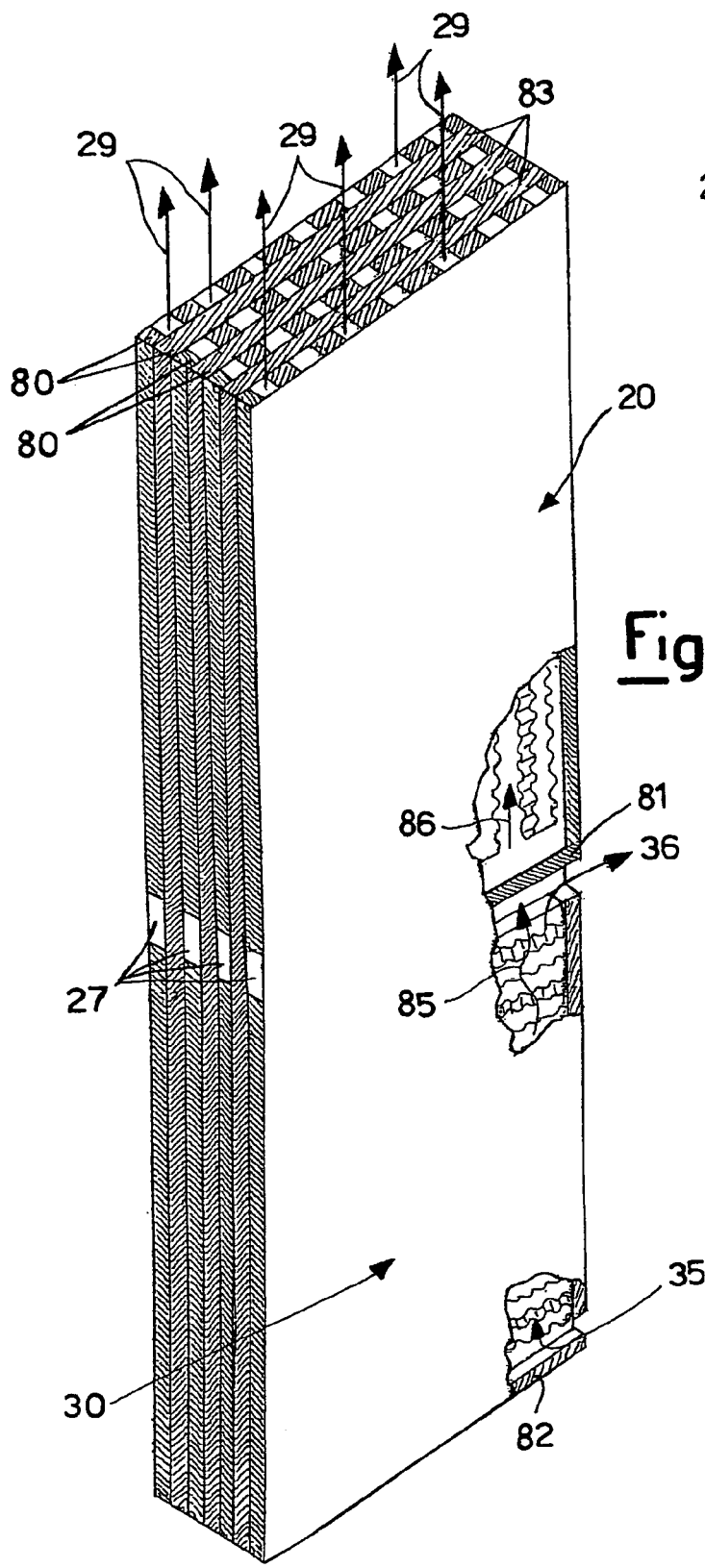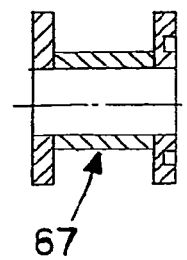

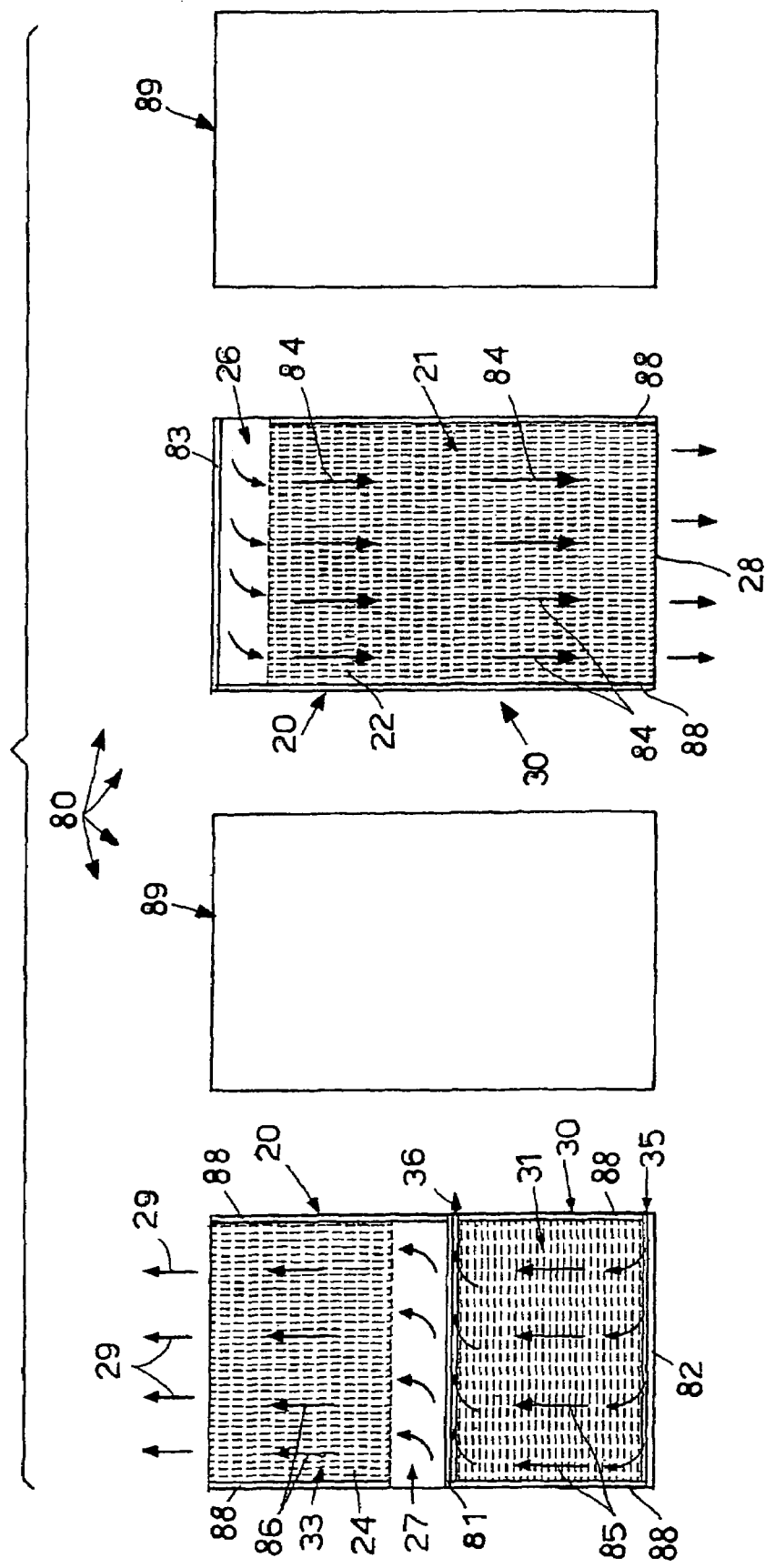

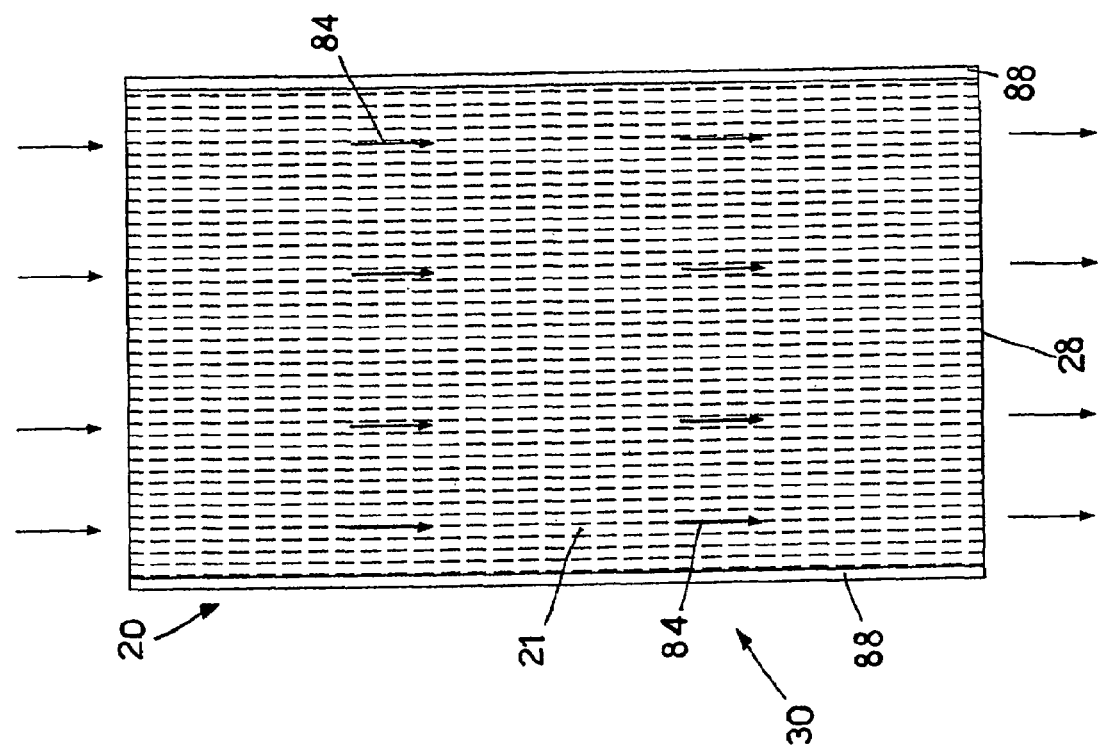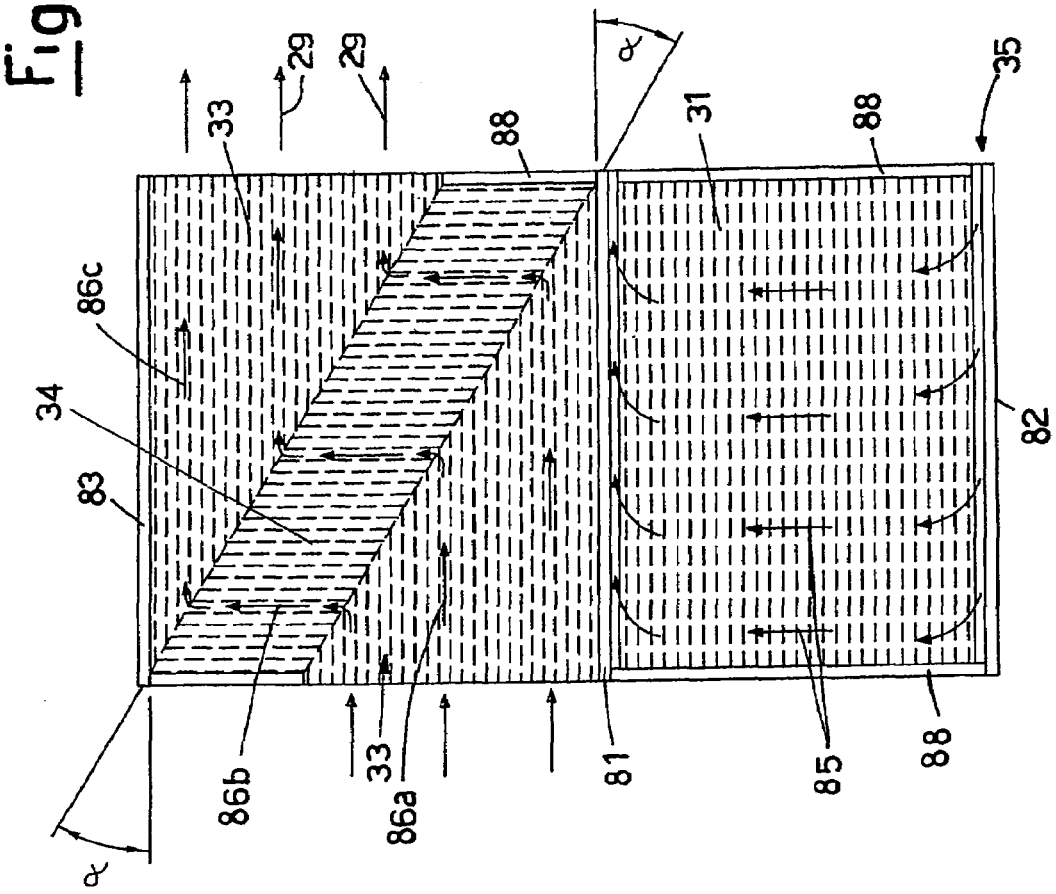

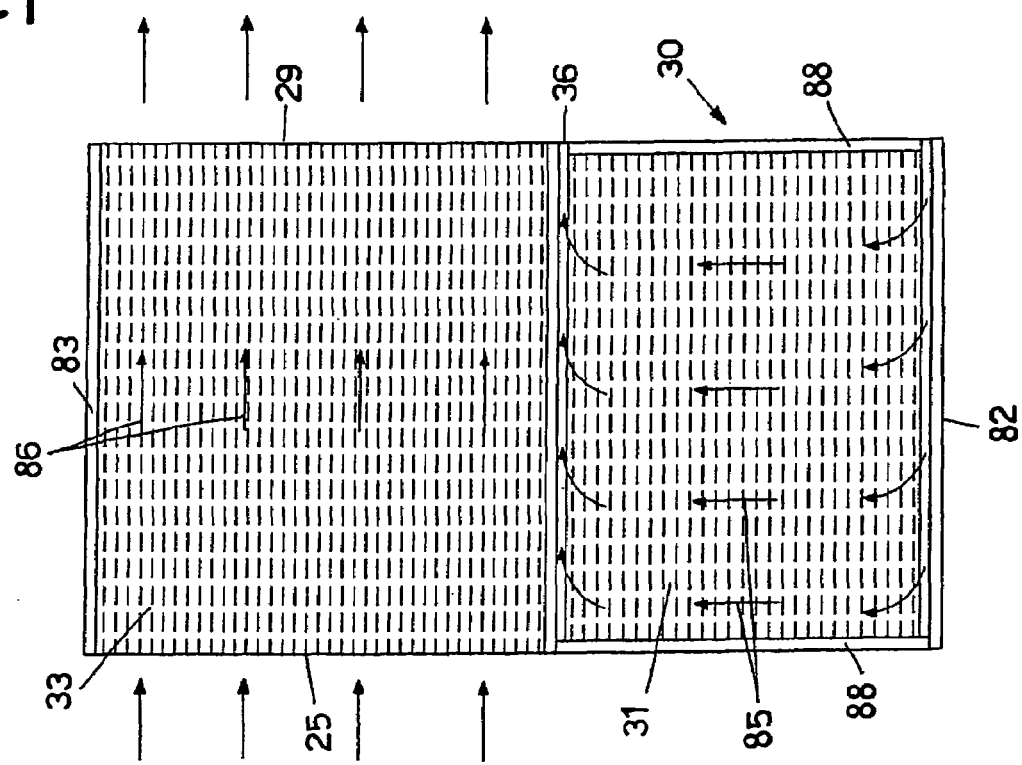
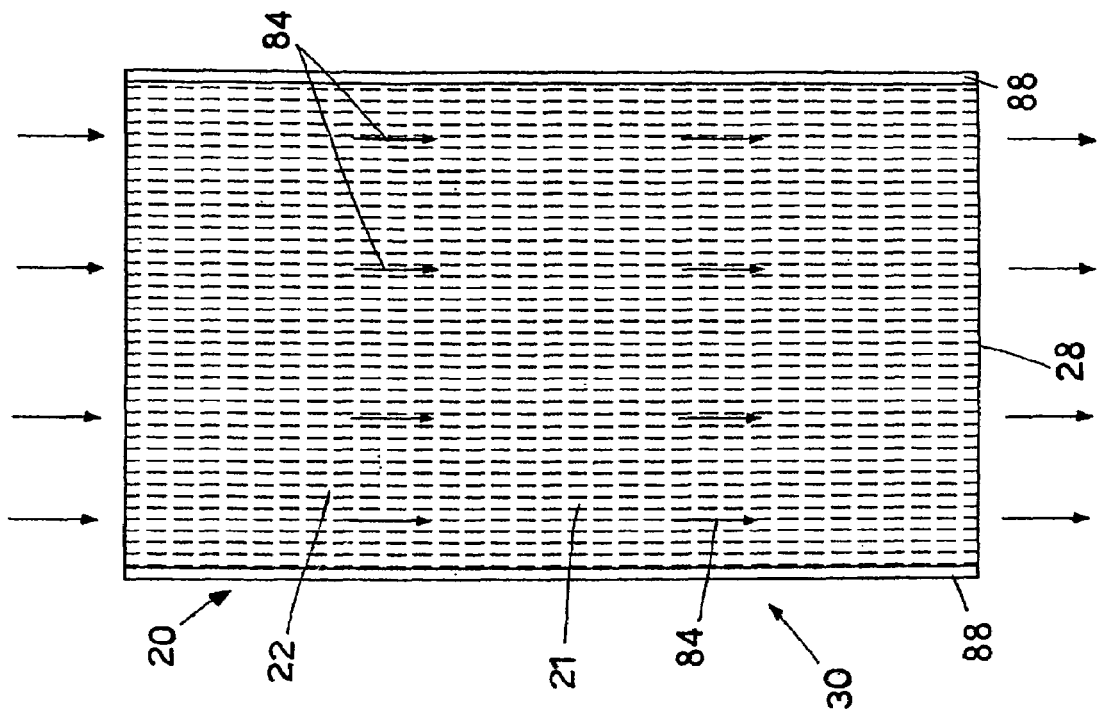
Fig. 7

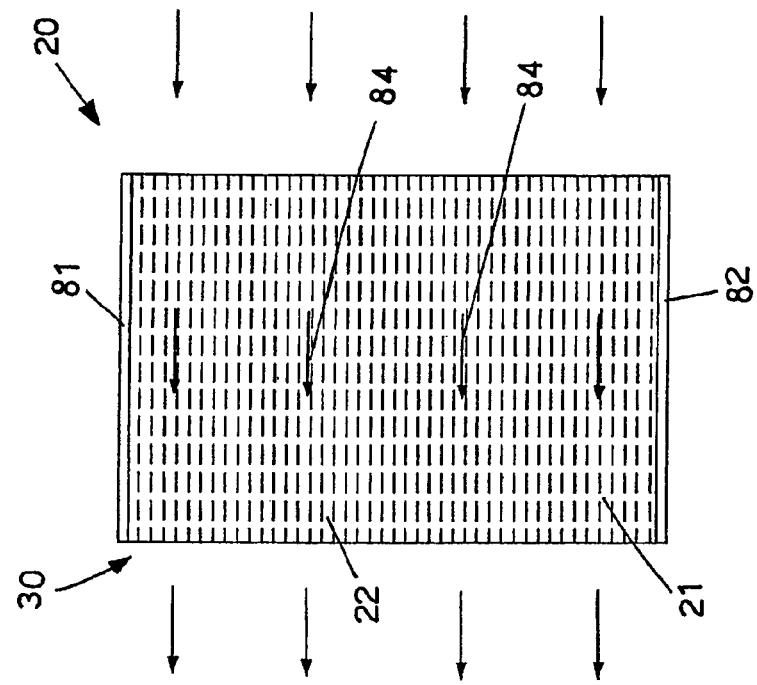
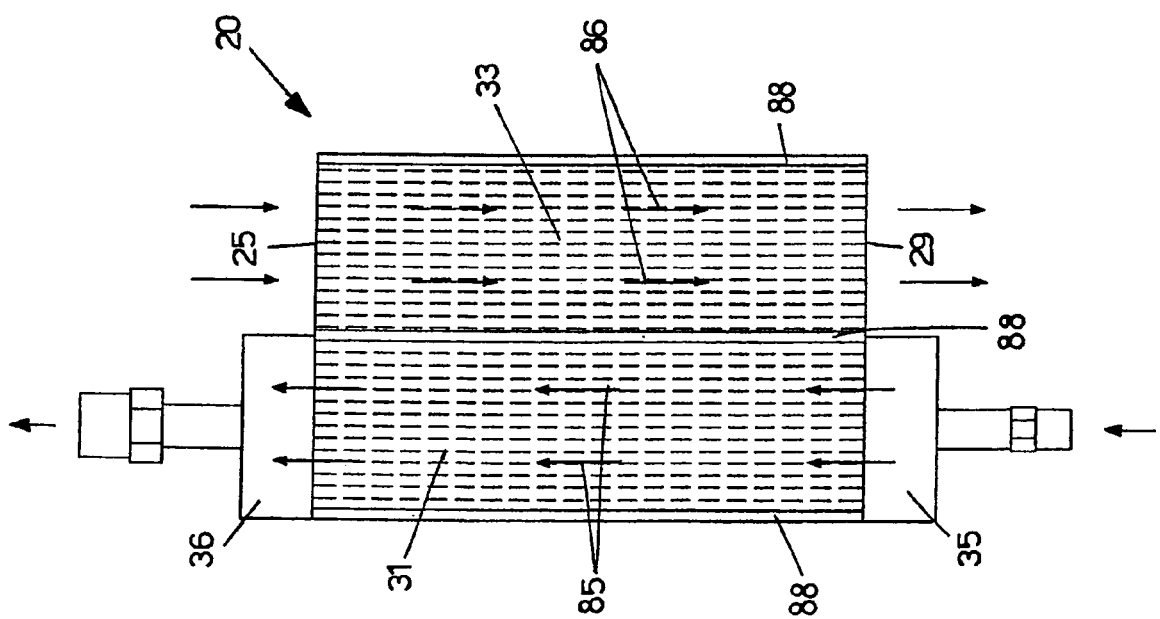
Fig. 9

REFRIGERATION-BASED COMPRESSED-GAS DRYER

The present invention refers to a refrigeration-based compressed-gas dryer.

A refrigeration-based compressed-gas dryer of the above-cited kind is substantially a refrigeration machine, which is usually employed to remove moisture from a given flow of compressed air or, for the matter, any other kind of compressed gas. In this connection, although reference will be generally made to compressed air in the following description, this shall be understood as extending to include and applying to any other kind of compressed gas, or mixture of compressed gases, that might require dehumidifying.

The humidity that is present in compressed air is generally known as being the main cause of corrosion and premature breakdown of piping systems, leading eventually to a malfunction or even full unserviceableness of the machines that use the compressed air. As a result, the need arises for this humidity to be removed from the compressed air prior to the latter being supplied to the machines and equipment that use it.

In its traditional mode of operation, a refrigeration-based compressed-air dryer usually works on the principle according to which the compressed air entering the dryer is cooled down in order to cause the humidity (water vapour) to condense.

The dryer essentially comprises a heat recovery apparatus, or gas-to-gas heat exchanger, and an evaporator working practically as a pair of heat exchangers.

When reference is made to a group of heat exchangers in the following description, this is intended to mean the above-mentioned heat recovery apparatus and evaporator as an assembly.

The compressed air to be dried is initially pre-cooled in a pre-cooling section of the heat recovery apparatus; then, it exits said pre-cooling section of the gas-to-gas heat exchanger and cools further down in a cooling section of the evaporator until reaching down to a desired dew point.

This cooling-down effect is brought about by a refrigerant medium evaporating in an evaporation section of the evaporator, through which this evaporating refrigerant medium is caused to flow by a refrigeration circuit.

At this point, the compressed air, upon having been so cooled down in the heat recovery apparatus in the first place and the evaporator in the second place, reaches an air condenser, or condensate separator, in which the condensed water vapour is separated from the air. The resulting condensate is then let off through a duly provided condensate drainage arrangement.

The air flow leaving the condensate separator flows then through the initial heat recovery arrangement of the refrigerating circuit, in a heating section, so as to bring about a pre-cooling effect by exchanging heat with the compressed air flowing into the dryer.

Known in the art there are gas-to-gas heat exchangers and evaporators of a great variety of kinds, obtained with the use of various technologies. In particular, known in the art there are refrigeration-based compressed-gas dryers, in which the pre-cooling and heating sections of the heat recovery arrangement, as well as the cooling sections of the air and the evaporation sections of the refrigerant medium in the evaporator are totally finned in an attempt to increase the efficiency and the compactness of the heat-exchanger group.

Cited in this connection there may for example be the group of heat exchangers described in the U.S. Pat. Nos. 5,845,505 and 6,085,529.

In these publications, the heat recovery arrangement and the evaporator are manufactured separately and then joined together to form a group of heat exchangers.

It therefore is a main object of the present invention to provide a refrigeration-based compressed-air dryer that is very compact, i.e. low in space requirements.

Another purpose of the present invention is to provide a refrigeration-based compressed-air dryer, which has an improved heat-exchange efficiency.

Yet another purpose of the present invention is to provide a refrigeration-based compressed-air dryer, which uses a group of heat exchangers capable of being manufactured at particularly low costs.

According to the present invention, these aims are reached in a refrigeration-based compressed-air dryer, which incorporates the characteristics and features as recited in the appended claims.

Anyway, the structural, operating and construction-related features of the present invention, as well as the advantages thereof over similar prior-art solutions, will be more readily understood from the detailed description that is given below by way of non-limiting example with reference to the accompanying drawings, which illustrate a group of heat exchangers for a refrigeration-based compressed-air dryer made in accordance with the innovative principles of the present invention, and in which:

FIG. 3a is a perspective elevational right-side, variously cut-away view of a detail of the group of heat exchangers illustrated in FIG. 2;

FIG. 3b is an exploded view of a heat-exchange stack of the group of heat exchangers illustrated in FIG. 2;

FIG. 3c is a partial perspective view of a detail of the group of heat exchangers according to the present invention;

FIG. 5 is an exploded view of a heat-exchange stack of the group of heat exchangers illustrated in FIG. 4;

FIG. 7 is an exploded view of a heat-exchange stack of the group of heat exchangers illustrated in FIG. 6;

FIG. 9 is an exploded view of a heat-exchange stack of the group of heat exchangers illustrated in FIG. 8;

FIG. 12b is a cross-sectional front view of a second embodiment of the manifold shown in FIG. 11.

Figure 1:
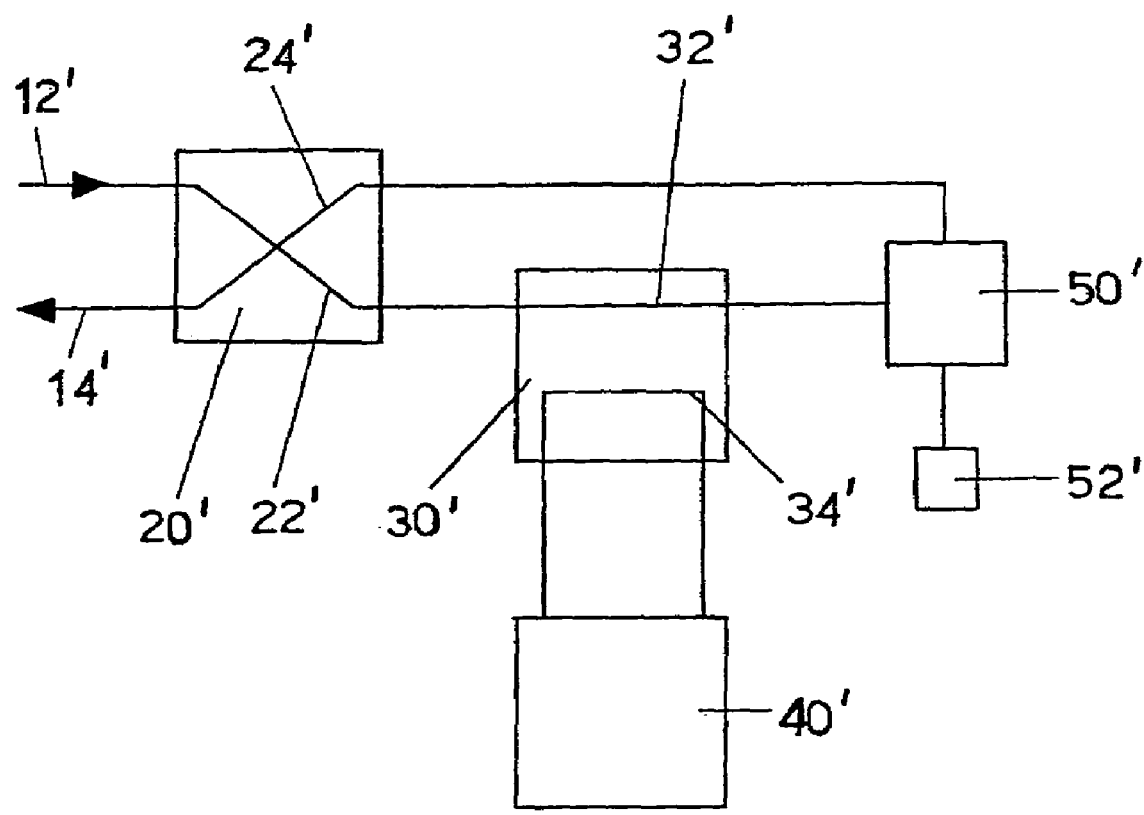
FIG. 1 is a schematical view of a refrigeration-based compressed-gas dryer according to the prior art.

With reference to FIG. 1, this can be noticed to schematically illustrate a refrigeration-based compressed-gas dryer according to the prior art, in which a compressed gas to be dried flows into an inlet pipe 12' and flows out in a dried state from an outlet pipe 14'.

As already set forth in the preamble to this description, a compressed-gas dryer according to the prior art comprises a gas-to-gas heat exchanger 20' including a pre-cooling section 22' for the compressed gas to be dried and a heating section 24' for the dried compressed gas, and an evaporator 30' with a cooling section 32' for the compressed gas and an evaporation section 34' for a refrigerant medium flowing through a refrigeration circuit 40'; furthermore, the dryer comprises a condensate separator 50'.

The various parts, which the dryer according to the prior art is basically made of, are provided in the form of building blocks, i.e. sub-assemblies that are then assembled together.

Figure 2:
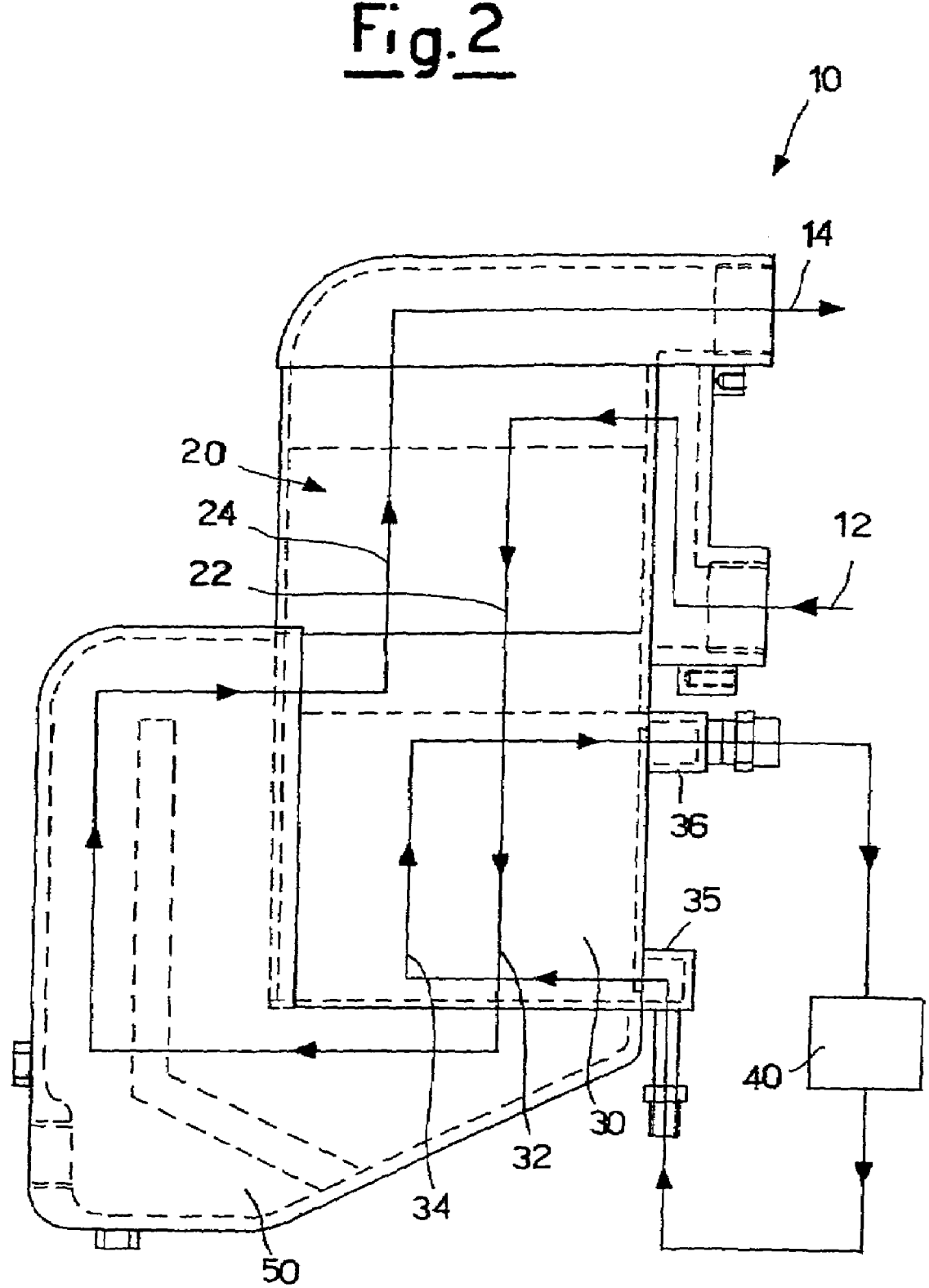
FIG. 2 is a schematical view of a group of heat exchangers for refrigeration-based compressed-gas dryers with counter-flow heat-exchange processes, according to the teachings of the present invention.

With reference to FIGS. 2 through to 12b, a refrigeration-based compressed-gas dryer according to the present invention comprises a group of heat exchangers 10, which in turn comprises a gas-to-gas heat exchanger or heat recovery apparatus 20 and an evaporator 30

The gas-to-gas heat exchanger 20 has a pre-cooling section 22 for the compressed gas to be dried and a heating section 24 for the dried compressed gas.

The evaporator 30 in turn has a cooling section 32 for the compressed gas and an evaporation section 34 for a refrigerant medium flowing through a refrigeration circuit 40; furthermore, the dryer comprises a condensate separator 50. In the schematic representation of the group of heat exchangers 10 according to the present invention, the heat-exchange processes take place in a counter-flow pattern.

The group of heat-exchangers 10 according to the present invention comprises its two heat exchangers, i.e. the heat recovery apparatus 20 and the evaporator 30, that are made in a single-piece construction as a unitary sub-assembly.

This enables the number of parts entering the construction of the heat-exchanger group to be reduced and, as a result, a very compact dryer construction to be obtained.

With the compressed-gas dryer according to the present invention, moreover, a significant reduction in both the number and the overall length, and hence in the weight, of the separation or spacing members is obtained.

The labour required to produce the heat-exchanger group (furnace brazing of a single stack instead of two ones, a smaller amount of spacing members, elimination of the need to weld two stacks) is reduced to a significant extent, thereby bringing down the overall cost of the dryer correspondingly.

In addition, in view of obtaining a heat-exchanger group 10 that is still more compact in its construction, a condensate separator 50 is preferably located near the evaporator 30, as shown in FIGS. 2, 4, 6 and 8.

FIG. 3a illustrates a heat-exchanger group 10 for a compressed gas to be dried in accordance with the present invention.

The heat-exchanger group 10 comprises a plurality of heat-exchanging stacks 80 adapted to cause the compressed gas to undergo first a pre-cooling and then a cooling process aimed at drying it, and finally a heating process.

With reference to also FIG. 3b, each stack 80 comprises a plurality of fins attached to thin sheet-metal plates. As used here, the term of fins, or finned plates, means sheet metal plates provided with fins preferably of aluminium and properly shaped so as to ensure a greater heat-exchange effect.

However, it will be readily appreciated that even the provision of different kinds of profiling, such as the use of bosses or the like, in view of increasing the heat-exchange surface area of the walls of the heat exchangers shall be understood as falling within the scope of the present invention. Anyway, the above-mentioned fins are soldered to thin aluminium sheet-metal plates 89.

The fins, or bosses, are obtained by drawing a thin sheet-metal plate so as to obtain a pattern of vertical and horizontal surfaces, wherein the horizontal surfaces lie in two planes spaced a few millimeters from each other, whereas the vertical surfaces, which represent the actual profiling, i.e. the outline of the fins, have such a geometry as to define flow passages and increase both the heat-exchange surface area and the turbulence of the flow passing therethrough.

As a result, by soldering or welding the horizontal surface of the fins to the sheet-metal plates 89 there are created and defined the "channels" or conduits for the air and the refrigerant medium to flow therethrough.

Usually, the conduits of the first fin or finned or embossed plate 21 are in the number of "n", whereas the conduits of the second and third fins or finned or embossed plates 31 and 33 are in the number of "n+1", so that each conduit of the first fin 21 exchanges heat with the two conduits of the second and third fins 31 and 33 lying adjacent thereto. Heat is exchanged through the thin sheet-metal plates 89 and both the horizontal and vertical surfaces of the fins.

It can be readily appreciated that the number of stacks 80 forming the heat-exchanger group 10 is itself equal to "n", i.e. to the number of first fins 21, and is roughly proportional to the flow rate of the gas to be treated.

Once the "n" stacks 80 are joined together, what is needed to complete the heat-exchanger group 10 is to add a sheet-metal plate 89 to complete all inlet, outlet and heat-exchange conduits.

Each stack 80 forms a part of the heat recovery apparatus 20 and a part of the evaporator 30.

Each stack 80 comprises a first fin or boss 21 that is attached to a sheet-metal plate 89, to which—on the opposite side—there are attached the second and third fins or bosses 31 and 33.

Furthermore, each stack 80 comprises a plurality of spacing members that are duly attached to the plurality of fins.

As used here, the term "spacing members" shall be understood to mean metal bars, preferably of aluminium, being square or rectangular in their cross-section and having a side thereof that is equal to the height of the vertical surfaces of the finned plate. These bars are then welded to the sheet-metal plates 89 on the two opposite sides thereof, corresponding to the horizontal surfaces of the finned plate.

The above-mentioned plurality of spacing members are adapted to define, jointly with the plurality of fins and sheet-metal plates 89, not only the afore-cited conduits for the passage of the compressed gas and the refrigerant medium, but also the inlet and outlet conduits for said gas and said refrigerant medium. Preferably, said plurality of spacing members comprises a member 81, a member 82, a member 83, and at least two members 88 extending perpendicularly thereto.

The horizontal surfaces of the first finned plate 21 and the members 83 and 88 are arranged on the same plane and attached to the sheet-metal plates 89 so as to define, along with a series of inlet conduits 26 for the compressed gas to be dried, a series of conduits 84.

The finned plates 33 and 31 are arranged on a second plane, lying adjacent to the plane of the first finned plate 21, close to each other. Between these finned plates there is arranged the spacing member 81 which, along with said members 88 and the sheet-metal plates 89, defines a conduit 27 extending adjacent to the finned plate 33, a conduit 36 extending adjacent to the finned plate 31, and the conduits 85 and 86. The distance from the finned plate 31 and the member 81 is preferably of a few centimeters.

Furthermore, the member 82 is arranged near the finned plate 31, on the opposite side with respect to the member 81, so as to define, jointly with one of said at least two members 88 and the sheet-metal plates 89, an inlet and outlet conduit 35, 36 for the refrigerant medium. The distance from the finned plate 31 and the members 81 and 82 is typically a few millimeters.

Therefore, the compressed gas to be dried flows into the inlet conduit 26, where it moves in contact with the sheet-metal plates 89, enters the conduits 84, through which it moves in contact with the surface of the first finned plate 21 and those areas of the sheet-metal plates 89 which are not covered by the first finned plate 21 itself, until it eventually flows out from an end portion 28 of the first finned plate 21.

It then flows through a condensate separator 50 and, thereupon, is directed into the conduit 27 and, subsequently, through the conduits 86, where it exchanges heat with and, hence, pre-cools the compressed gas that flows in the upper part of the conduits 84. As a result, the compressed gas that flows in the upper part of the conduit 86 is heated up before leaving the heat-exchange stack 80 from an end portion of the finned plate 33.

The refrigerant medium enters the conduit 35 and is directed into the conduits 85, where it exchanges heat and, hence, cools down the compressed gas that flows in the lower part of the conduits 84. Therefore, it clearly appears that the part relating to the finned plate 31 works as an evaporator 30, since the refrigerant medium evaporates, thereby cooling the compressed gas, whereas the part of the stack 80 relating to the finned plate 33 works as a heat recovery arrangement 20.

Each conduit 84 is provided with an inlet 26 for the compressed gas directed to the pre-cooling section 22, said compressed gas then continuing to flow through the evaporator 30 until it reaches the outlet 28. From this outlet, the cooled compressed gas, upon having been separated from the condensate, is conveyed through an inlet 27 into a post-heating section of the heat recovery arrangement 20 to eventually exiting the same heat recovery arrangement through the section 29 thereof, thereby leaving the heat-exchange stack 80.

Figure 4:
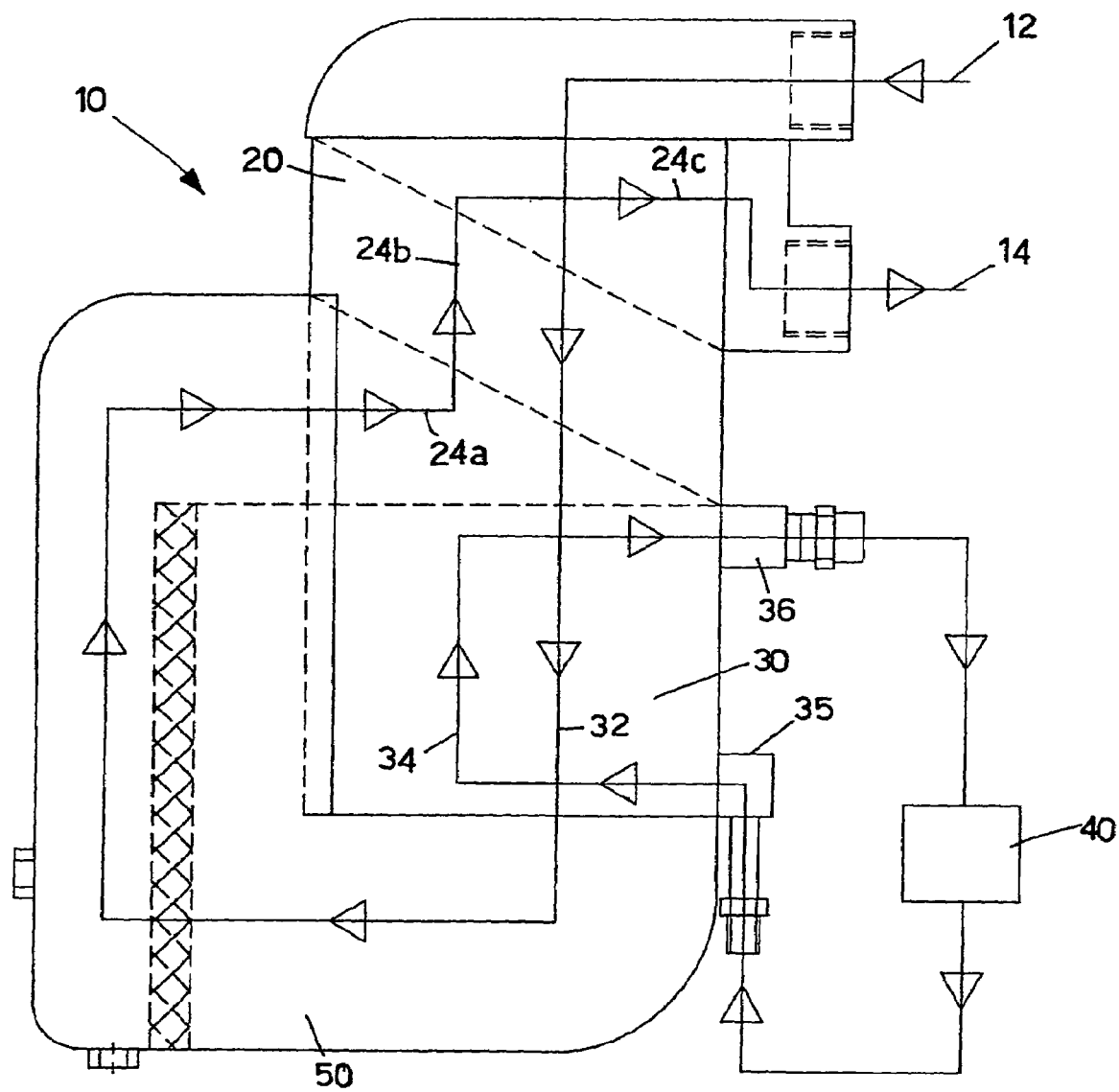
FIG. 4 is a schematical view of a group of heat exchangers for refrigeration-based compressed-gas dryers with combined cross-flow and counter-flow heat-exchange processes in the heat recovery apparatus and counter-flow heat-exchange processes in the evaporator, according to the teachings of the present invention.

FIG. 4 schematically illustrates a group of heat exchangers 10 according to the present invention, in which the heat-exchange processes take place in a counter-flow mode in the evaporator and a combined counter-flow and cross-flow mode in the heat recovery apparatus.

In the gas-to-gas heat exchanger 20, in fact, the heating section 24 is subdivided into three portions, i.e. a first portion 24a, in which the flow is perpendicular to the pre-cooling section 22, a second portion 24b running parallel to and in the opposite direction (counter-current) with respect to said pre-cooling section 22, and a third portion 24c, in which the flow becomes again perpendicular to the pre-cooling section 22.

In this group of heat exchangers 10, as compared with the embodiment illustrated in FIG. 2, the option has been preferred calling for the air inlet 12 to be interchanged with the outlet 14. In this way, the inlet sections 26 and 27, which were without fins, actually, have been eliminated, thereby improving the mechanical strength of the stacks 80, although an absolute counter-flow heat-exchange pattern would on the other hand be in all cases better than a mixed flow pattern.

FIG. 5 illustrates an exploded view of a heat-exchange stack of the group of heat exchangers shown in FIG. 4, in which the sheet-metal plates 89, however, are not indicated. The fins of the heating section 24 have been provided in the form of three pieces that are cut by a same angle $\alpha$ (e.g. 45°) relative to the horizontal axis: the inlet fins 33 are oriented such that the air flow is perpendicular to the flow in the conduit 84; they are followed by fins 34, which are oriented such that the flow is caused to turn by an angle of 90° so as to be brought into a direction parallel to the flow in the conduit 84, and finally by another fin that is equal to the afore-mentioned fin 33, but specular thereto with respect to the oblique cutting plane.

The air that flows out from the section 28, after having passed through the condensate separator 50, flows into the heating section 24 from the section 25, while passing in series through the conduits 86a, 86b and 86c, until it eventually comes out from the section 29. The spacing member 83, which is shown delimiting the conduits 84 in FIG. 3b, is in this case arranged above the conduits 86c.

Figure 6:
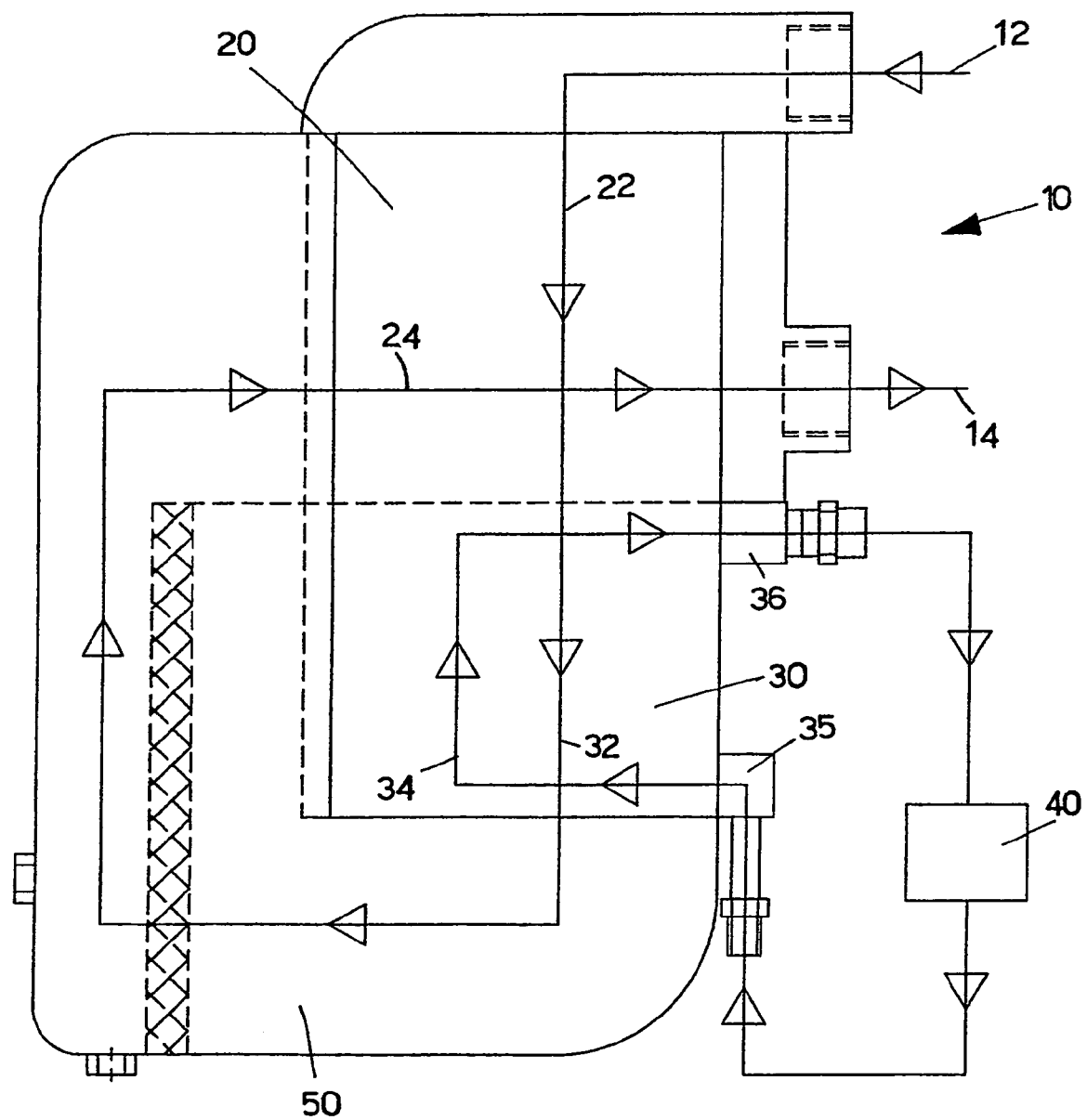
FIG. 6 is a schematical view of a group of heat exchangers for refrigeration-based compressed-gas dryers with cross-flow heat-exchange processes in the heat recovery apparatus and counter-flow heat-exchange processes in the evaporator, according to the teachings of the present invention.

FIG. 6 illustrates a schematical representation of a group of heat exchangers 10 according to the present invention, in which the heat-exchange processes take place in a counter-flow mode in the evaporator and in a cross-flow mode in the heat recovery arrangement.

In the gas-to-gas heat exchanger 20, in fact, the flow in the heating section 24 is perpendicular to the flow in the pre-cooling section 22.

As compared with the embodiment illustrated in FIG. 2, even in this group of heat exchangers 10 the option has been preferred calling for the air inlet 12 to be interchanged with the outlet 14. In this way, the inlet sections 26 and 27, which were without fins, actually, have been eliminated, thereby improving the mechanical strength of the stacks 80, although an absolute counter-flow heat-exchange pattern would on the other hand be in all cases better than a mixed flow pattern. A further advantage of this embodiment lies in the quite simple construction of the heating section 24 and a further reduction in the number of spacing members.

FIG. 7 illustrates an exploded view of a heat-exchange stack of the group of heat exchangers shown in FIG. 6, in which the sheet-metal plates 89, however, are not indicated. The fins 33 of the heating section 24 are provided in a single-piece, unitary construction and are oriented such that the air flow is perpendicular to the flow in the conduit 84.

The air that flows out from the section 28, after having passed through the condensate separator 50, flows into the heating section 24 from the section 25 by passing through the conduits 86, until it eventually comes out from the section 29. The spacing member 83, which is shown delimiting the conduits 84 in FIG. 3b, is in this case arranged above the conduits 86.

Figure 8:
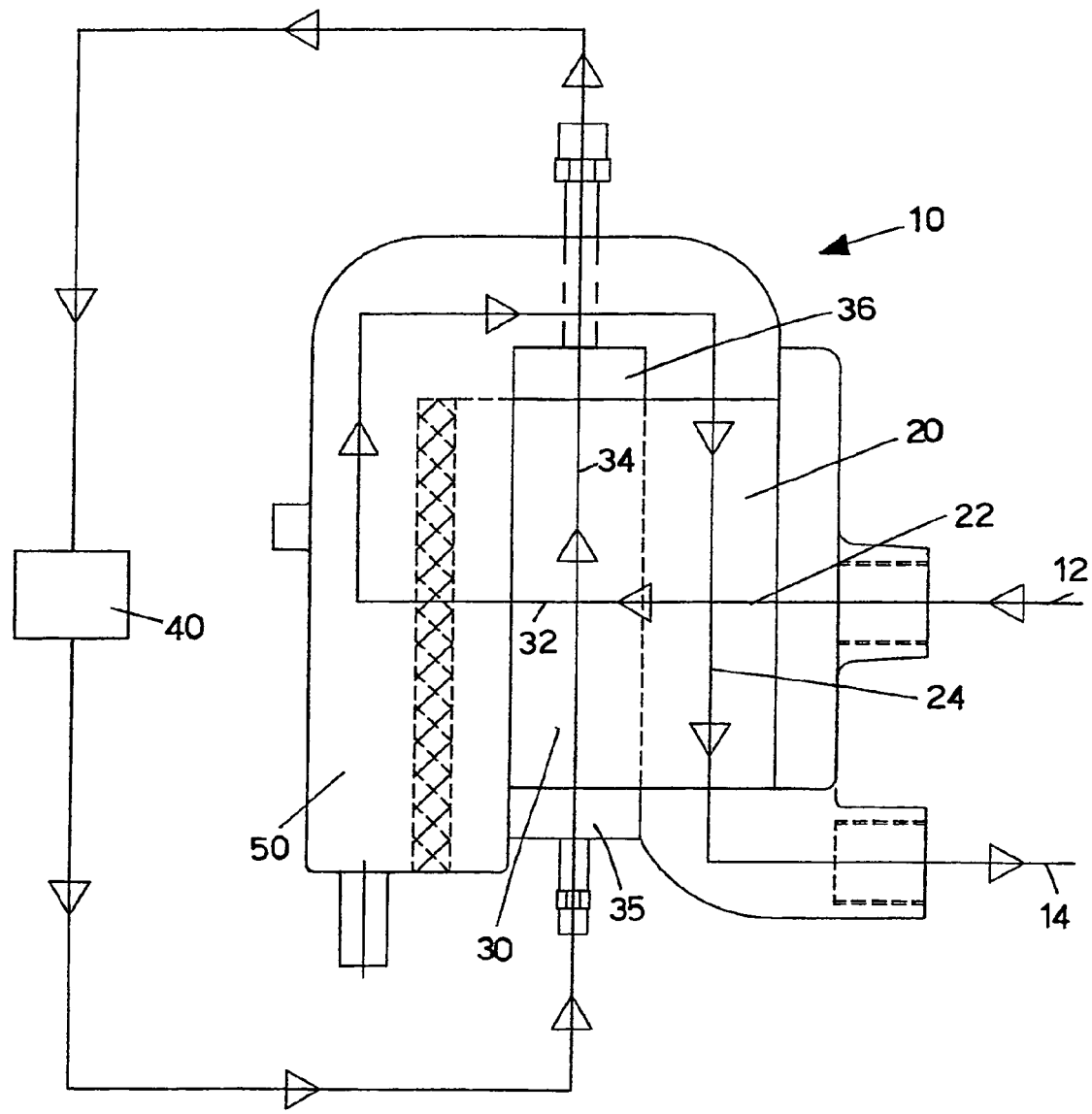
FIG. 8 is a schematical view of a group of heat exchangers for refrigeration-based compressed-gas dryers with cross-flow heat-exchange processes, according to the teachings of the present invention.

FIG. 8 illustrates a schematical representation of a group of heat exchangers 10 according to the present invention, in which the heat-exchange processes take place in a cross-flow mode both in the evaporator and in the heat recovery arrangement.

From the illustration in FIG. 9 it can be most clearly noticed how this group of heat exchangers 10 is made out of a single piece, with an obvious, significant saving effect over similar prior-art heat exchangers.

The following table, which compares the present invention with the prior art constituted by the U.S. Pat. Nos. 5,845,505 and 6,085,529, highlights some basic differences:

|  | No. of heat exchangers to be furnace-brazed | No. of fins | No. of spacing members |
|---|---|---|---|
| Prior art | 2 | 4 | 8 |
| Present invention | 1 | 3 | 5 |

The simultaneous reduction in the number of pieces to be furnace brazed, the number of fins and the number of spacing members leads to a corresponding reduction in manufacturing and labour costs. As far as the spacing members are concerned, there is also a saving effect deriving from a reduction in material usage, owing to a member 88 being practically eliminated.

Figure 10:
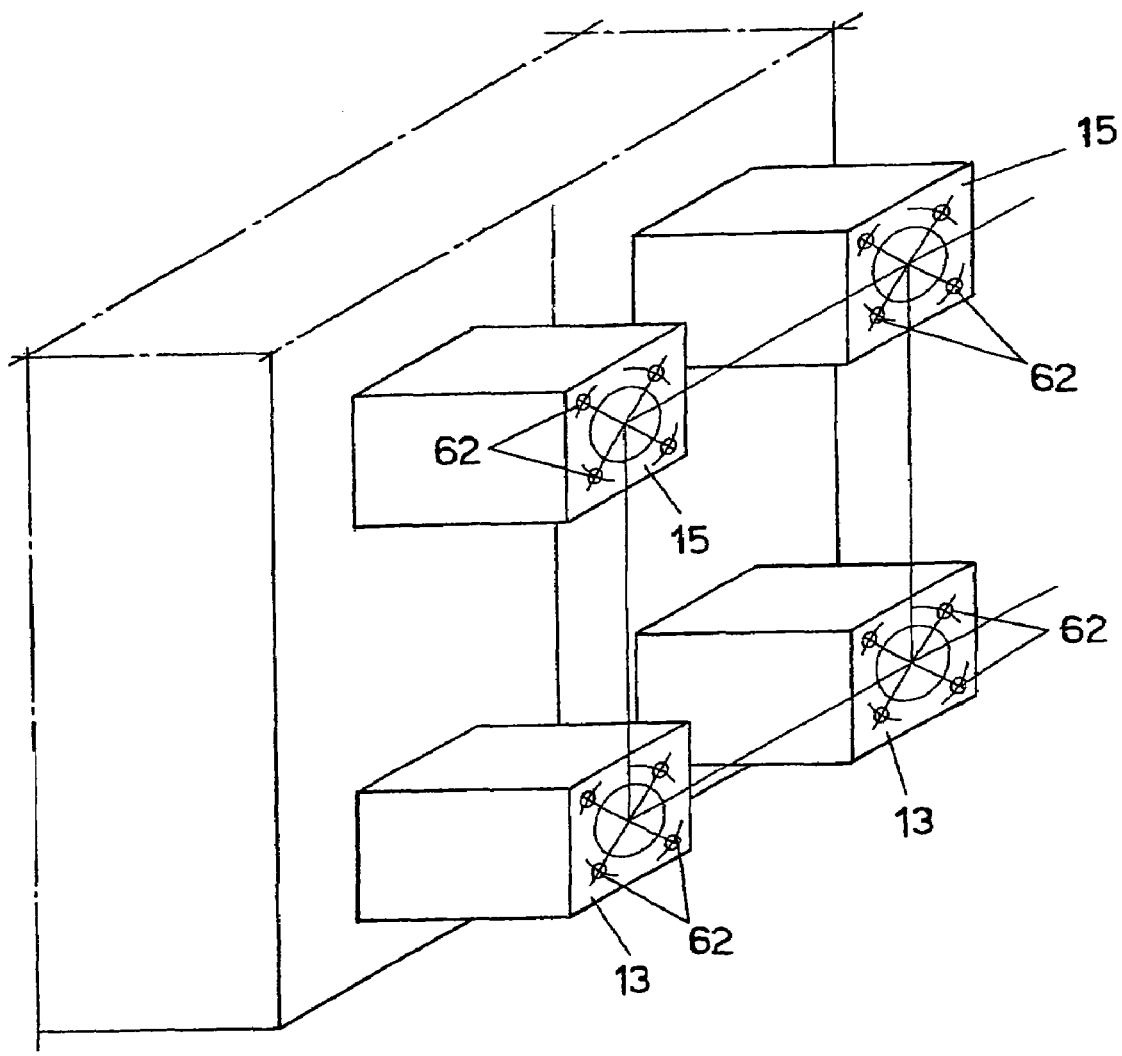
FIG. 10 is an axonometric view of compressed-gas inlet and outlet connection of two dryers according to the present invention, in a parallel arrangement thereof.

FIG. 10 illustrates a schematical representation of two groups of heat exchangers 10 according to the present invention in a parallel arrangement, in which the inlet pipes 12 and the outlet pipes 14 have respective inlet connections 13 and outlet connections 15 in a co-planar arrangement and equally spaced at a same centre-to-centre distance.

Figure 11:
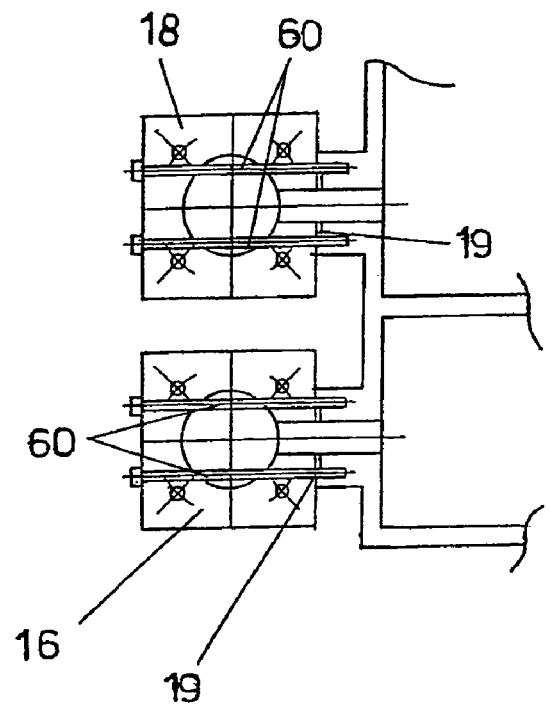
FIG. 11 is a cross-sectional side view of two inlet and outlet manifolds adapted to connect the inlet and outlet connections shown in FIG. 10, respectively.
Figure 12:
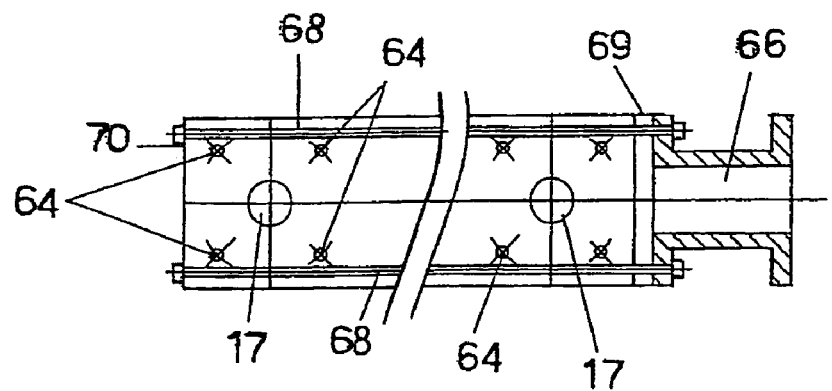
FIG. 12 is a cross-sectional front view of a first embodiment of the manifold shown in FIG. 11.

FIGS. 11 and 12 illustrate an inlet manifold 16 and an outlet manifold 18, which are secured to said inlet connections 13 and outlet connections 15 by means of tie-bolts 60 passing through blind holes 62 provided in the same connections 13 and 15, as well as holes 64 provided in the manifolds 16 and 18 themselves.

The manifolds 16 and 18 have a series of side apertures 17, which are complementary to and in the same number as the connections 13 and 15 of the heat-exchanger groups 10 arranged in parallel, which may in turn be in a higher number than the two ones illustrated in FIG. 10.

The manifolds 16 and 18 are each provided with a flanged connection fitting 66, 67 attached thereto by means of tie-bolts 68. Between the connections 13 and 15 and the apertures 17 of the manifolds 16 and 18 there are provided seal means 19, whereas seal means 69 are provided between the flanged connection fittings 66, 67 and the manifolds 16 and 18.

Furthermore, a blind plate 70 seals each manifold 16 and 18 on the opposite side with respect to the flanged connection fittings 66, 67. This blind plate 70 is secured by means of the tie-bolts 68, wherein seal means of the same kind as the seal means 69 are placed between the manifolds 16 and 18 and the plates 70.

The heat-exchange processes in the heat-exchanger groups 10 may take place in various modes, as described below.

In practice, with reference to FIGS. 2, 4, 6 and 8 there are illustrated various embodiments, in which the heat recovery arrangement and the evaporator work, i.e. exchange heat according to different modes. In particular, with reference to FIG. 2 both of them exchange heat in a counter-flow mode; with reference to FIG. 4, the heat recovery arrangement exchanges heat in a mixed counter-flow and cross-flow mode, whereas heat is exchanged in the counter-flow mode in the evaporator; with reference to FIG. 6, the heat recovery arrangement exchanges heat in the cross-flow mode, whereas heat is exchanged in the counter-flow mode in the evaporator; with reference to FIG. 8 both the heat recovery arrangement and the evaporator exchange heat in a cross-flow mode.

In addition, there can be provided a further embodiment—not shown in the Figures, but easily derivable from the above-cited ones—in which the heat recovery arrangement exchanges heat in the counter-flow mode, whereas heat is exchanged in a mixed counter-flow and cross-flow mode in the evaporator.

By way of example, it will now be described how heat-exchange processes in the first embodiment illustrated in FIG. 2 have been designed so as to obtain an absolute counter-flow heat-exchange mode.

The series of first fins 21, sheet-metal plates 89 and spacing members define, in spaces comprised therebetween, a series of passages for the compressed gas to be dried to flow therethrough. Similarly, the series of second and third fins 31 and 33, sheet-metal plates 89 and spacing members define, in spaces comprised therebetween, a series of passages for the evaporating refrigerant medium and the compressed air, which heats up when passing through the condensate separator 50, to flow therethrough, respectively.

The portion of the first fins 21 that is close to the inlet 26, and the fins 33 are flown through, in a mutually opposite direction, by the compressed air to be pre-cooled and the compressed air to be heated, respectively, so as to bring about a heat-exchange process taking place in a purely counter-flow mode; they form the pre-cooling section 22 for the gas to be dried and the heating section 24 of the heat recovery arrangement 20 for the dried gas, respectively.

The portion of the first fins 21 that is close to the outlet 28, and the second fins 31 are flown through, in a mutually opposite direction, by the compressed air to be dried and the evaporating refrigerant medium, respectively, so as to bring about a heat-exchange process taking place in a purely counter-flow mode; they form the cooling section 32 and the evaporation section 34 of the evaporator 30, respectively.

In this way, just a single fin, i.e. finned plate is used to provide the pre-cooling section 22 and the heating section 24, without any need for channels or similar passages to be provided, thereby ensuring a very compact construction.

It should on the other hand be duly noticed that the inlet 26 of the pre-cooling section, the inlet 27 of the heating section, as well as the inlet 35 and the outlet 36 for the refrigerant medium have no fins, as this can be most clearly seen in FIGS. 3a and 3b.

This practically ensures that both the compressed gas and the refrigerant medium are able to distribute evenly along the passages.

Furthermore, in order to improve the mechanical strength in the inlet and outlet zones, the option is to be preferred calling for the fins 33 to be situated above the inlet zone 26, considering that the compressed gas entering the heat-exchanger groups 10 is at a higher pressure than the compressed gas leaving the same heat-exchanger groups 10, and considering further the fact that, since the pre-cooling circuits are in an alternate arrangement with the heating circuits, the wall of the channel 26 press against the fins 33, which are therefore in a compressed working state.

In a particular embodiment thereof, the dryer comprises, for the zones 26 and 27, a very sparse, i.e. thinned-out finned surface, as it may for instance be formed by sheet-metal plates press-drawn so as to form cylindrically shaped fins that are widely spaced from each other, to the sole purpose of increasing the mechanical strength of the above-mentioned zones, without affecting the distribution of the media.

In this way, the brazed or welded surfaces are able to increase not only the heat-exchange coefficient thereof, but also—at the same time—the mechanical strength of the channels that are in this formed, thereby enabling the same channels to much more easily and effectively withstand the pressure exerted thereupon by the compressed gas or the refrigerant medium flowing therethrough, especially when the channels are exposed to compressive stress.

A further aspect of the present invention relates to several heat-exchanger groups of the kind shown in FIG. 3 being coupled with each other in a parallel arrangement.

In this way, a modular structure is provided, which enables a group of heat exchangers providing a multiple capacity to be actually formed.

To do this, use is made of the inlet manifolds 16 and outlet manifolds 18 to connect the inlet connections 13 and the outlet connections 15, respectively, with each other, thereby enabling the overall dimensions to be reduced along with the labour required for assembly.

The manifolds 16 and 18 are produced by extrusion and are then machined so as to be able to be most rapidly and easily coupled to the compressed-gas inlet and outlet connections 13 and 15, respectively.

Each dryer featuring heat-exchanger groups 10 coupled to each other in a parallel arrangement has two manifolds 16 and 18. Each one of these has a number of side apertures 17 that is equal to the number of heat-exchanger groups 10 to be coupled to each other.

The manifolds 16 and 18 are cut to length according to the actual number of heat-exchanger groups 10 coupled together.

In order to ensure fluid-tight sealing between the heat-exchanger group 10 and the manifolds 16 and 18, use is made of a proper gasket 19 for each inlet connection 13 and each outlet connection 15. Furthermore, the attachment of the manifolds to the various connections can for instance be secured by means of four tie-bolts 60 for each connection 13 or 15, to be screwed into the blind holes 62 of the same connections 13 and 15.

For the manifolds 16 and 18 to be connected to the inlet pipes of the compressed gas to be dried and the outlet pipes of the dried compressed gas, each such manifold is provided, on the head side thereof, with a flanged connection fitting 66, 67. On the opposite side with respect to the one where said flanged connection fitting 66 is provided, each manifold 16 and 18 is on the contrary sealed by a blind plate 70.

Specifically, the flanged connection fitting 66 is formed by a short cylindrical conduit, at the end portions of which there are welded—externally with respect to the same conduit—two perforated plates, whose perforation is as large as the outside diameter of the conduit.

One of these plates is provided with a series of holes that are used to secure—by means of corresponding tie-bolts 68—the flanged connection fitting 66 to the manifold 16 or 18 and the blind plate on the opposite side. The other plate is typically a flange used as a connection for the inlet and outlet pipes of the compressed gas.

The flanged connection fitting 67 is on the contrary constituted by a single flange acting as a connection for the inlet and outlet pipes of the compressed gas, featuring outwardly counterbored holes provided therein to securing purposes by means of the above-mentioned tie-bolts 68.

In this way, the locknuts used to fasten the tie-bolts will not be of hindrance, i.e. interfere with a possible user's counter-flange, since said locknuts are received within said counterbored holes.

As already stated earlier in this description, the end portion of the manifolds 16 and 18 located on the opposite side of, i.e. on the side opposed to the one at which there is provided the above-mentioned flanged connection fitting 66, 67, is closed by the blind plate 70, which is in turn provided with a same number of holes as the perforated plate of the flanged connection fitting 66, 67. These holes in the blind plate 70 correspond to the holes provided in said perforated plate, so as to enable the tie-bolts 68 to be inserted therethrough.

The efficiency of a heat-exchange process taking place in a cross-flow mode is largely known to be rather poor. This is particularly true when the outlet temperatures of the two media cross themselves, i.e. when the outlet temperature of the medium due to heat up must be higher than the temperature of the medium due to cool down, so as this usually occurs in compressed-gas dryers.

For example, at an inlet temperature of the compressed air into the pre-cooling section of 35° C. and an inlet temperature into the heating section of the gas-to-gas heat exchanger of 3° C., it proves rather difficult, if a cross-flow heat-exchange process is used, to obtain an outlet temperature from the heating section that is greater than 25 to 26° C., even if large heat-exchange surfaces are used in combination with particular, sophisticated fins or finning patterns.

With counter-flow heat-exchange processes according to the present invention, for the same heat-exchange surface, a same extent of pressure loss or flow resistance and with the use of fins of a traditional kind, the flow can on the contrary leave the heating section at a temperature that may be in excess of 30° C., thereby increasing the amount of recovered heat by as much as 20% or even more, or it may leave said heating section at a temperature of 25 to 26° C. by drastically reducing pressure losses.

Similarly, an evaporator working in a pure counter-flow mode, while using the same heat-exchange surface and having the same pressure losses as an evaporator working in a cross-flow mode, will enable—even if it makes use of fins of a traditional kind—the difference between the air outlet temperature and the temperature of the evaporating refrigerant medium to be reduced, especially when this refrigerant medium is a mixture of gases that does not evaporate at a constant temperature (e.g., R407c with a glide of approx. 6° C.) and when the refrigerant medium itself is desirably over-heated in view of minimizing the amount of liquid refrigerant returning to the compressor, as this usually occurs in compressed-gas dryers. The ultimate result is an improved thermodynamic efficiency, i.e. COP (which stands for Coefficient Of Performance), of the refrigeration circuit.

Thanks to the improvement in the efficiency of the heat-exchange processes carried out in a counter-flow mode, in view of obtaining a same level of performance as the one ensured by cross-flow heat exchangers use can simply be made of fins, or finning designs, of a traditional kind.

From what has been set forth in the above description with reference to the accompanying drawing, it can be most readily appreciated how a refrigeration-based compressed-gas dryer according to the present invention as described in connection with the first embodiment thereof illustrated in FIG. 2, can actually be considered as being particularly useful and advantageous.

Even the other embodiments of the present invention, although doing fully or partly without the more effective counter-flow heat-exchange mode, can anyway be considered as being advantageous, since they still enjoy the benefit deriving from the possibility for both the heat recovery arrangement and the evaporator to be made as a single-piece, unitary assembly (FIGS. 5, 7 and 9).

The afore-indicated aims of the present invention are therefore fully and effectively reached. It will of course be readily appreciated that the refrigeration-based compressed-gas dryer according to the present invention may be embodied in a number of ways differing from the ones that have been described hereinbefore and illustrated in the accompanying drawing by mere way of non-limiting example, and the materials indicated in connection with the construction of the various parts of the dryer may also be different, without departing from the scope of the present invention as defined by the appended claims.

The invention claimed is:

1. Refrigeration-based compressed-gas dryer comprising a group of heat exchangers (10), this group of heat-exchangers including a gas-to-gas heat exchanger (20), an evaporator (30), a condensate separator (50) and at least a refrigerating circuit (40), wherein in said gas-to-gas heat exchanger (20) there is provided a pre-cooling section (22), where heat is exchanged between a mixture of compressed gases to be dried entering said group of heat exchangers (10), and a heating section (24) for a mixture of dried gases exiting a condensate separator (50), wherein in said evaporator (30) there is provided a cooling section (32), where heat is exchanged between said mixture of compressed gases to be dried exiting the gas-to-gas heat exchanger (20), and an evaporation section (34) for a refrigerant medium, where said mixture of compressed gases is cooled down to a desired dew point, characterized in that said group of heat exchangers (10) comprises a set of finned or embossed plates (21, 31, 33), which are stacked and joined with each other so as to be adapted to create a number of passages for the counter-current flow and/or cross flow and/or mixed flow of said gases, and that said group of heat exchangers is provided as a single-piece, unitary assembly.

2. Refrigeration-based compressed-gas dryer according to claim 1, characterized in that said group of heat exchangers (10) comprises a plurality of heat-exchange stacks (80).

3. Refrigeration-based compressed-gas dryer according to claim 2, characterized in that each stack (80) comprises a plurality of finned or embossed plates placed upon each other and held together by means of sheet-metal plates (89).

4. Refrigeration-based compressed-gas dryer according to claim 3, characterized in that said plurality of finned or embossed plates comprise a first finned or embossed plate (21), a second finned or embossed plate (31) and a first finned or embossed plate (33).

5. Refrigeration-based compressed-gas dryer according to claim 4, characterized in that each stack (80) comprises a plurality of spacing members and sheet-metal plates (89), which are joined to said plurality of finned plates to define the inlet, outlet and heat-exchange conduits of the heat exchangers.

6. Refrigeration-based compressed-gas dryer according to claim 5, characterized in that said plurality of spacing members comprise a member (81), a member (82), a member (83) and at least two members (88).

7. Refrigeration-based compressed-gas dryer according to claim 6, characterized in that the first finned plate (21), the member (83), said at least two members (88) and the sheet-metal plates (89) are arranged in a first plane or tier so as to define a series of inlet conduits (26) for the compressed gas to be dried and a series of heat-exchange conduits (84).

8. Refrigeration-based compressed-gas dryer according to claim 7, characterized in that the second and third finned plates (31, 33) are arranged in a second plane or tier, close to each other, the spacing member (81) being placed between them so as to define, jointly with said at least two members (88) and the sheet-metal plates (89), a conduit (27) extending adjacent to the finned plate (33), a conduit (36) extending adjacent to the finned plate (31), as well as the heat-exchange conduits (85, 86).

9. Refrigeration-based compressed-gas dryer according to claim 8, characterized in that the member (82) is situated close to the finned plate (31), on the opposite side with respect to the member (81), so as to define, jointly with said at least two members (88) and the sheet-metal plates (89), an inlet conduit (35) for a refrigerant medium.

10. Refrigeration-based compressed-gas dryer according to claim 9, characterized in that the first, second and third finned plates (21, 31, 33) are joined to the members (81, 82, 83, 88) and the sheet-metal plates (89) so as to form a single-piece, unitary assembly.

11. Refrigeration-based compressed-gas dryer according to claim 1, characterized in that said group of heat exchangers has a counter-current flow pattern, and that the inlet conduit (26) of a pre-cooling section (22), the inlet conduit (27) of a heating section (24), the conduit (35) and the conduit (36) are without fins, so that the mixture of compressed gases is capable of distributing evenly into the passages prior to flowing through said pre-cooling section (22) and heating section (24).

12. Refrigeration-based compressed-gas dryer according to claim 11, characterized in that between the inlet conduit (26) of the pre-cooling section (22) and the inlet conduit (27) of the heating section (24) there are inserted members that assist in evenly distributing the mixture of compressed gases and improve the mechanical strength.

13. Refrigeration-based compressed-gas dryer according to claim 12, characterized in that said members comprise sheet-metal plates that are press-drawn so as to form cylindrically shaped fins that are widely spaced from each other.

14. Refrigeration-based compressed-gas dryer according to claim 1, characterized in that there are provided in a parallel arrangement at least two of said groups of heat exchangers (10), each one of which provided with an inlet connection (13) for connection to an inlet pipe (12) for the mixture of compressed gases to be treated, and an outlet connection (15) connecting to an outlet pipe (14) for the mixture of treated compressed gases.

15. Refrigeration-based compressed-gas dryer according to claim 14, characterized in that said inlet connections (13) and said outlet connections (15) are co-planar and equally spaced at a same centre-to-centre distance.

16. Refrigeration-based compressed-gas dryer according to claim 15, characterized in that said inlet connections (13) are connected via an inlet manifold (16), and that said outlet connections (15) are connected via an outlet manifold (18).

17. Refrigeration-based compressed-gas dryer according to claim 16, characterized in that said inlet manifolds (16) and said outlet manifolds (18) have a series of side apertures (17), complementary to and in the same number as the connections (13, 15) of the heat-exchanger groups (10) arranged in parallel, and are attached via sealing gaskets (19) to said connections (13, 15) with the aid of retaining means.

18. Refrigeration-based compressed-gas dryer according to claim 17, characterized in that said retaining means comprise tie-bolts (60) passing through blind holes (62), which are provided in a surface of said connections (13, 15), and holes (64) provided in the manifolds (16, 18) themselves.

19. Refrigeration-based compressed-gas dryer according to claim 16 or 17, characterized in that said manifolds (16, 18) are provided each with a flanged connection fitting (66, 67) for connection to said inlet pipes (12) and outlet pipes (14), respectively, said flanged connection fitting being positioned on an end portion of said manifolds (16, 18).

20. Refrigeration-based compressed-gas dryer according to claim 19, characterized in that said flanged connection fitting (66) is formed by a short cylindrical conduit, at the end portions of which there are joined, externally with respect to the same conduit, two bored plates, whose bore is as large as the outside diameter of the conduit, in which one of these plates is provided with a series of holes that are used to secure, by means of corresponding tie-bolts (68), the flanged connection fitting (66) to the manifold (16, 18) and a blind plate (70) on the opposite side, whereas the other plate is typically a flange used as a connection for the inlet and outlet pipes (12, 14) of the mixture of compressed gases, in which said blind plate (70) closes the manifold (16, 18) on the side opposed to the one at which there is provided said flanged connection fitting (66).

* * * * *